(12) United States Patent
McCoy et al.

(10) Patent No.: US 9,338,494 B2
(45) Date of Patent: May 10, 2016

(54) METHOD AND APPARATUS FOR PROVIDING RECOMMENDED CONTENT PLAYBACK ON A DISPLAY DEVICE

(75) Inventors: Charles McCoy, Coronado, CA (US); Ling Jun Wong, Escondido, CA (US); True Xiong, San Diego, CA (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 549 days.

(21) Appl. No.: 13/077,608

(22) Filed: Mar. 31, 2011

(65) Prior Publication Data

US 2012/0210371 A1    Aug. 16, 2012

Related U.S. Application Data

(60) Provisional application No. 61/441,888, filed on Feb. 11, 2011.

(51) Int. Cl.
| | | |
|---|---|---|
| *H04N 7/173* | (2011.01) | |
| *H04N 21/422* | (2011.01) | |
| *H04N 21/4722* | (2011.01) | |
| *H04N 21/4782* | (2011.01) | |
| *H04N 21/61* | (2011.01) | |
| *H04N 21/63* | (2011.01) | |
| *H04N 21/84* | (2011.01) | |
| *H04N 21/466* | (2011.01) | |
| *H04N 21/482* | (2011.01) | |
| *H04N 21/845* | (2011.01) | |
| *H04N 21/442* | (2011.01) | |

(52) U.S. Cl.
CPC ...... *H04N 21/42219* (2013.01); *H04N 21/4722* (2013.01); *H04N 21/4782* (2013.01); *H04N 21/482* (2013.01); *H04N 21/6125* (2013.01); *H04N 21/6175* (2013.01); *H04N 21/44227* (2013.01); *H04N 21/4668* (2013.01); *H04N 21/4826* (2013.01); *H04N 21/632* (2013.01); *H04N 21/84* (2013.01); *H04N 21/8456* (2013.01)

(58) Field of Classification Search
CPC .......... H04N 21/4668; H04N 21/4826; H04N 21/632; H04N 21/84; H04N 21/8456
See application file for complete search history.

(56) References Cited

U.S. PATENT DOCUMENTS

| | | | | |
|---|---|---|---|---|
| 6,115,461 | A | 9/2000 | Baiyor et al. | |
| 7,133,051 | B2 * | 11/2006 | Sloo et al. | 345/629 |
| 7,185,355 | B1 * | 2/2007 | Ellis et al. | 725/46 |

(Continued)

FOREIGN PATENT DOCUMENTS

| | | |
|---|---|---|
| CN | 101390387 | 3/2009 |
| CN | 101789935 | 7/2010 |

OTHER PUBLICATIONS

Office Action issued in corresponding Chinese application No. 201210022953.9 dated May 5, 2014.

*Primary Examiner* — Nicholas Corbo
(74) *Attorney, Agent, or Firm* — Frommer Lawrence & Haug LLP; William S. Frommer; Ellen Marcie Emas

(57) ABSTRACT

An IPTV (Internet Protocol Television) as a first display device may be controlled in part by user on a second display device. The second display device can set start and end times for content which the user of the second display device recommends to the IPTV device.

23 Claims, 6 Drawing Sheets

(56) References Cited

U.S. PATENT DOCUMENTS

| | | | |
|---|---|---|---|
| 8,230,469 B1* | 7/2012 | Ho | H04N 21/47208 725/114 |
| 2002/0166123 A1* | 11/2002 | Schrader et al. | 725/58 |
| 2003/0005448 A1* | 1/2003 | Axelsson et al. | 725/58 |
| 2003/0115274 A1* | 6/2003 | Weber | 709/206 |
| 2004/0221305 A1* | 11/2004 | Broussard et al. | 725/38 |
| 2005/0028208 A1* | 2/2005 | Ellis et al. | 725/58 |
| 2005/0186988 A1* | 8/2005 | Lim et al. | 455/557 |
| 2007/0180488 A1* | 8/2007 | Walter et al. | 725/135 |
| 2011/0078717 A1* | 3/2011 | Drummond et al. | 725/14 |

* cited by examiner

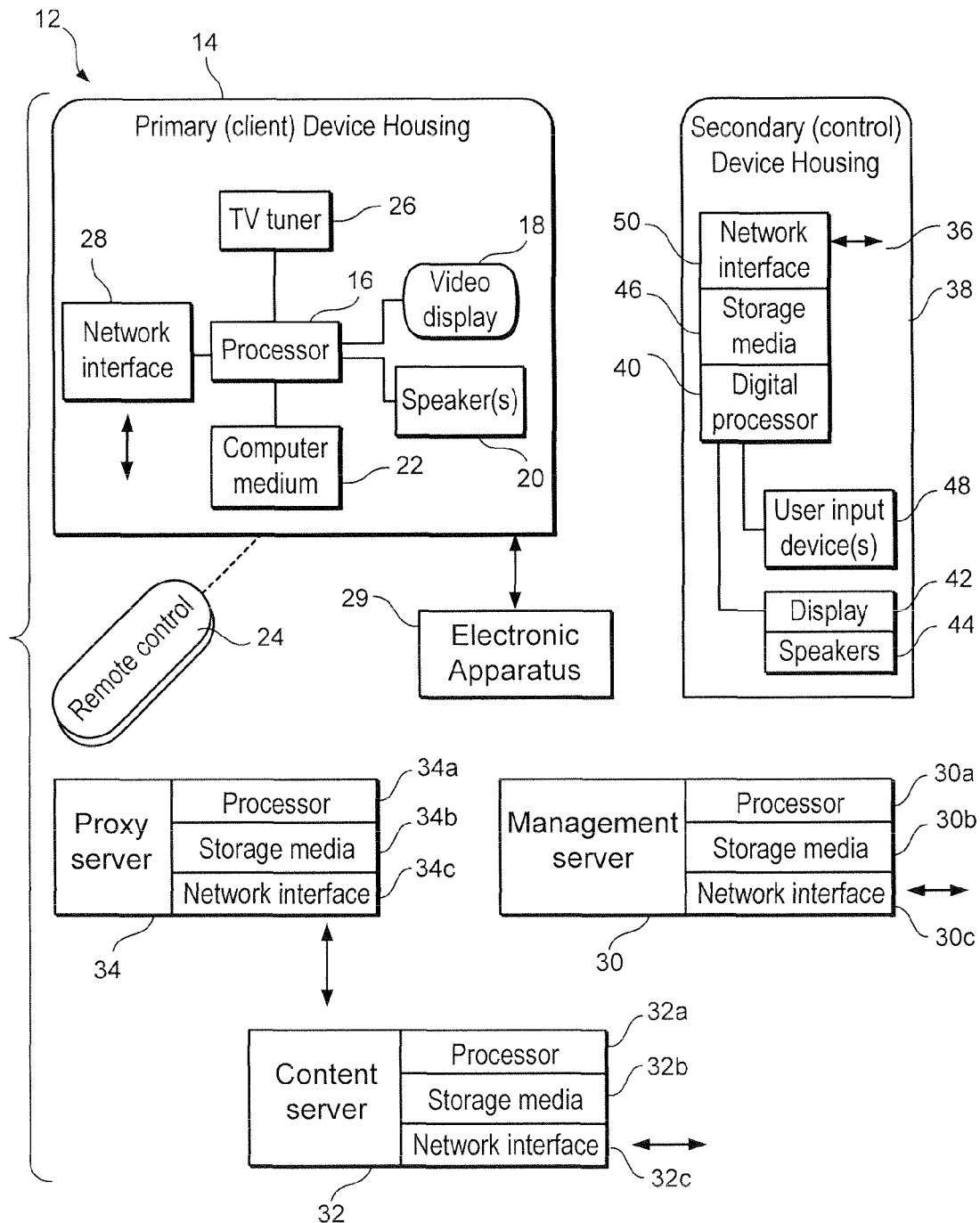
F I G. 1

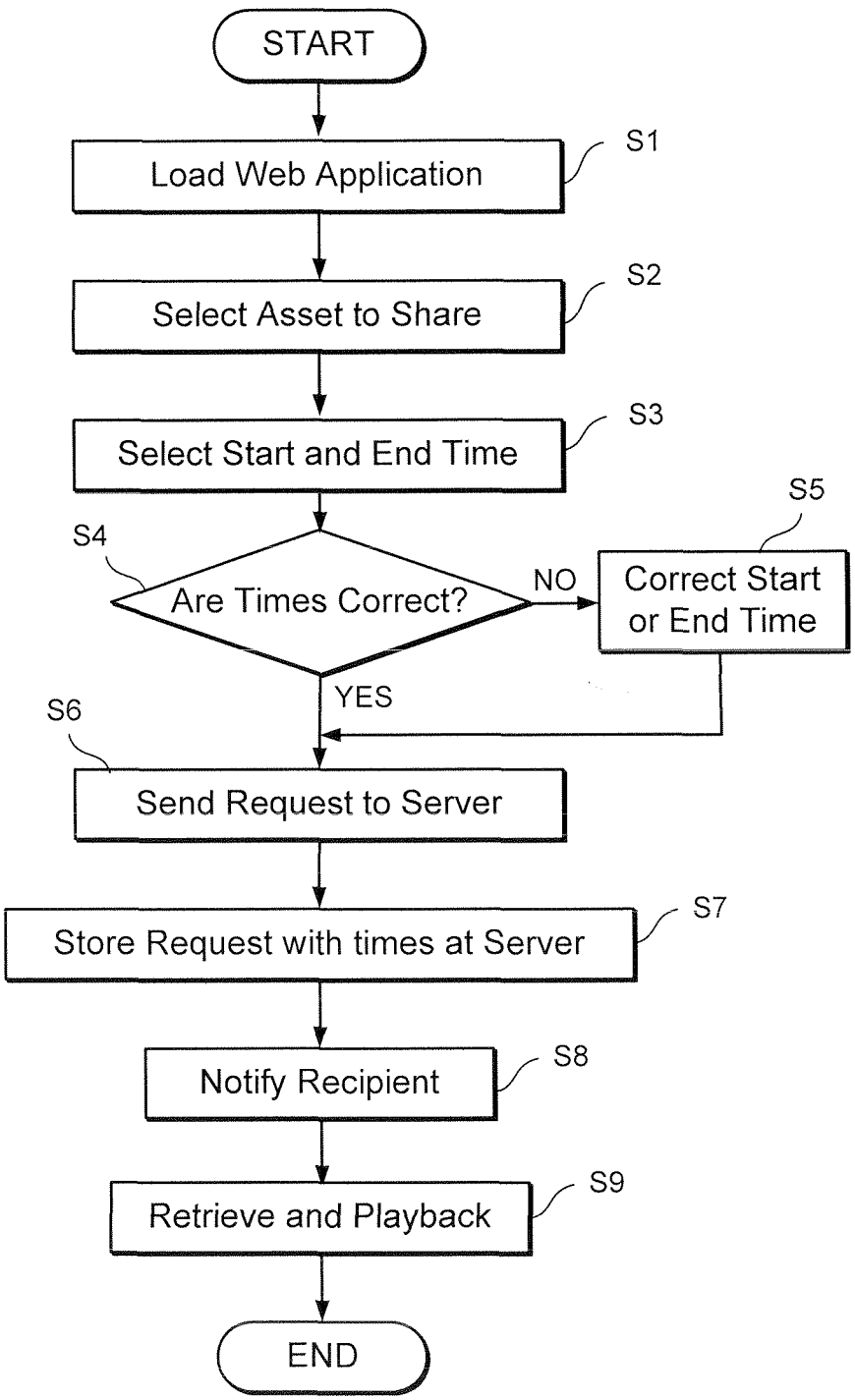
F I G. 5

METHOD AND APPARATUS FOR PROVIDING RECOMMENDED CONTENT PLAYBACK ON A DISPLAY DEVICE

CLAIM TO PRIORITY

This application claims the benefit of previously filed provisional application U.S. Ser. No. 61/441,888 filed Feb. 11, 2011, which is hereby incorporated by reference in its entirety herein.

BACKGROUND

1. Field of the Invention

This application generally relates to controlling a first display device such as an Internet Protocol Television (IPTV) using a second display device. The present invention allows a user on the second display device to specify a time segment of a recommended content/asset for playback on an Internet. Protocol TV (IPTV).

2. Background Discussion

Internet access through TVs is typically provided by essentially programming the TV (often referred to as an Internet Protocol TV, or IPTV) as though it were a computer executing a browser. Such internet access is thus uncontrolled except as a firewall or filtering program might block certain sites.

As will be understood herein, uncontrolled Internet access may not be desirable in the context of a TV. A firewall or filtering program may not always be installed on the TV and even when one is installed, access remains much more uncontrolled than conventional TV programming traditionally has expected. Also, a locally installed filter can be unloaded or defeated by a user.

Accordingly, uncontrolled. Internet access has several drawbacks. From a viewer's standpoint, exposure to inappropriate subject matter particularly when young viewers are watching is one concern; a much lower threshold of quality screening is another. That is, while many TV shows might not be widely considered as "quality" shows, nonetheless a TV program is usually much more selectively screened than, say, an Internet video. The expectations of TV viewers for such higher, level quality screening as a consequence cannot be met by simply providing unfettered Internet access through the TV. Furthermore, TV-related entities, from content providers, manufacturers, and carriers, in most cases derive no benefit from the extension of TV to the Internet, such as e.g., might be derived, as will be understood herein, by pay-per-view based on one or more options.

As further recognized herein, a user might happen to want to control an IPTV using a second device while the IPTV is executing its usual functions. This may be, e.g., because the second device has a convenient user interface or user input device, or because a second person may wish to browse Internet content available to the IPTV while another person is watching or otherwise controlling the IPTV.

IPTV is capable of receiving services delivered using the architecture and networking methods of the Internet Protocol Suite as well as services delivered using a broadcasting network. IPTV services include, for example, live television, time-shifted programming, video on demand (VOD), and on-line transactions.

SUMMARY

The present invention is useful when a user of an Internet content providing service wants to share only a portion of a content/asset with another user or subscriber of the internet content providing service. The other parts of the content/asset could be private or irrelevant. This means that the other user is directed to the most desired part of the content/asset instead of having to search/seek through the content/asset to get to the desired portion. Since the other user/viewer/subscriber does not need to perform a search/seek, time is saved and thus the present invention provides a-better user experience.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 1 shows a block diagram of an IPTV system.

FIG. 5 shows a flow chart of an example according to the present invention.

DETAILED DESCRIPTION

Figure 2A:
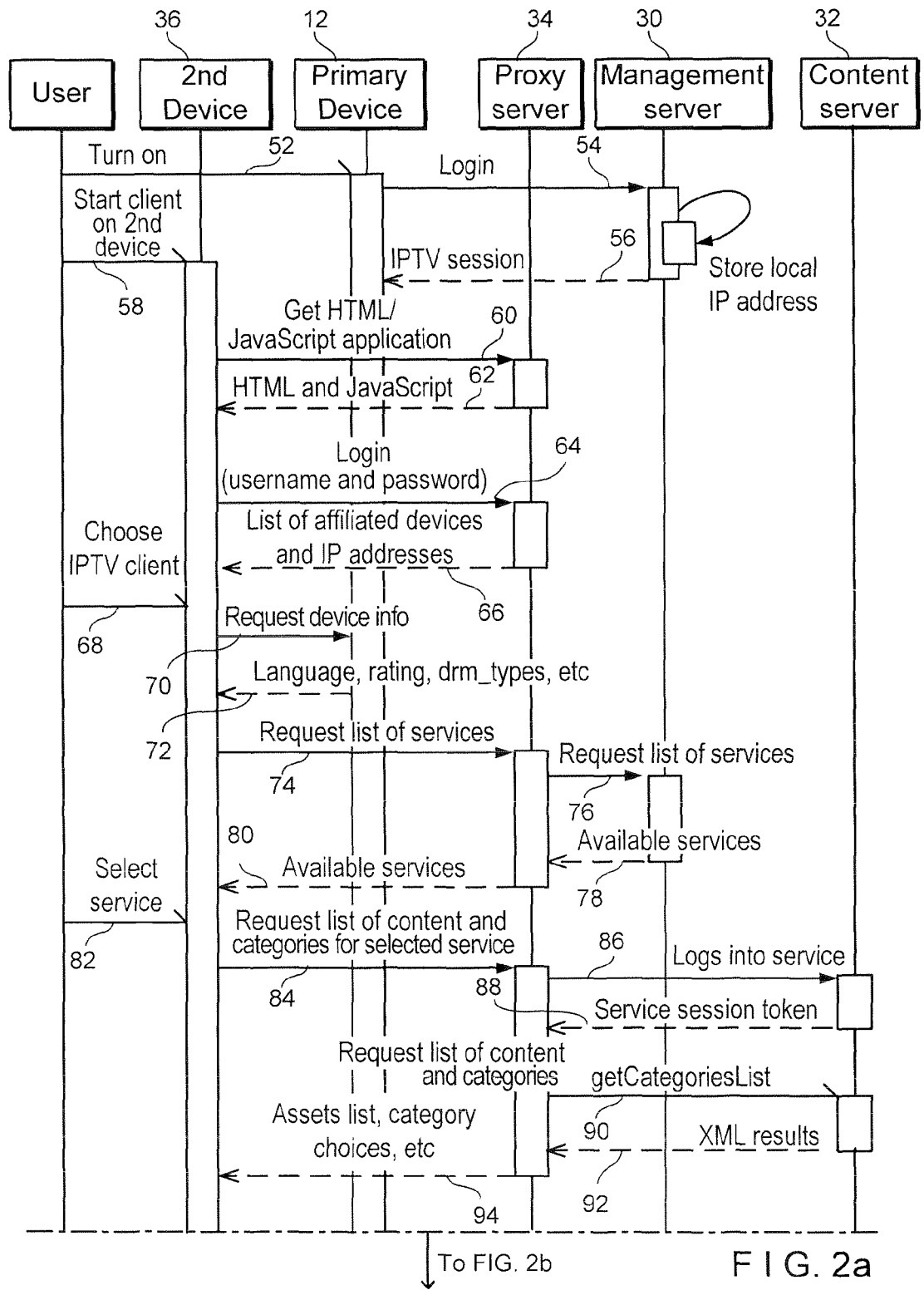
FIG. 2 shows a series of steps according to the IPTV system.

It is noted that in this disclosure and particularly in the claims and/or paragraphs, terms such as "comprises;" "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by; the following description. As used in this application, the terms "component" and "system" are intended to refer to a computer-related entity, either hardware, a combination of hardware and software, software, or software in execution. For example, a component may be; but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic, media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules, or processing facilities. The processing devices, or modules, or facilities, may be coupled such that portions of the processing and/or data manipulation may be performed at one or more processing devices and shared or transmitted between a plurality of processing devices.

An IPTV device may be used to control home appliances through IPTV. These home appliances include, for example, video players, game players, home theater systems, digital video recorders, air conditioners, and etc. Household electrical appliances and audio-visual apparatuses, such as video cassette recorders (VCRs), televisions, air conditioners, and lighting apparatuses, may be furnished with remote controls. These remote controls each have operation units and functions specific to each apparatus. In order to control home appliances, a dedicated remote control may be placed in a vicinity of an associated home appliance. IPTV provides the ability to integrate different functions or different applications into a single control device to control multiple appliances. This single control device may be a smart phone, a digital personal assistant, a personal computer, lap top computer, tablet, or other device with adequate processing and/or storage capabilities. The single control device may transmit control signals through a public network or Internet or other network of operatively coupled computers, or processing devices or modules to an IPTV device, which uses the control command to control home appliances.

An IPTV device can access a vast pool of contents provided by numerous content providers. The IPTV device may also be used to control further distribution of content that has been provided by a third party to the IPTV device so that unauthorized access is prevented. Typically, IPTV is controlled by a single input device and has a single display device. As a shared device that is viewed by several users it is helpful to permit this sharing without excessively raising hardware costs.

Accordingly, a method is provided to enable a user to manipulate, (e.g., browsing, searching, displaying, pausing, playback, or other operation) on a second device, to have their selection played by a first device. The user can then continue to browse the content on any number of second devices without interrupting the content that is playing on the first device. The first device may be an IPTV. The second device may be another electronic device. The method include an architecture design and implementation that allows a user to navigate, browse, and search content on a second device that may be a consumer electronic device such as a Sony Ericsson® smart phone, VAIO® PC, VAIO® laptop, Mylo®, personal computer, or other apparatus with sufficient processing and storage capability, or any device with a web browser. Concurrently, while a user is using the first device, another user can perform these activities on the second device and send a media selection to the first device of the another user's choice for playback A second device, also referred to as a secondary device and/or a secondary display device, herein, performs manipulating functions such as searching, content playback, browsing (when operable with a web browsing application) and may act as a visual aid to the IPTV device, but does not require additional investments by the user because it makes use of a device (such as a cellphone, laptop, etc) which most users would typically already have in their possession. The second device executes a program that allows the second device to act as the visual aid. It is a low cost solution which opens up a huge window of business and technical opportunities for use with one or more IPTV devices. It is a favorable complement to the IPTV because the secondary device has strengths in data entry, processing power and user experience in content management. Thus, users will be able to use their personal devices, such as a cellphone, to perform manipulations, such as, for example, browse content in their own language, perform data entry, search for content, manage their content, perform transactions and personalize their experience without disturbing the big screen of a first device. Users only send the content for playback on the IPTV device when they are ready to watch it; and playback of proprietary content does not occur on the non-authentic device so security risks are minimized. The program may be written in any suitable language with desired functionality, such as, for example, JavaScript or HTML, or other language with the desired functionality, which can be loaded by any device with a browser or an application written in languages which may not be run in a web browser, such as C, C++, Java, etc., hence not limited to only a small set of compatible devices.

An IPTV system typically includes an IPTV client device that includes a display and a processor, for controlling a video display of content on the IPTV client device. The system also includes a second device (also referred to as a secondary device and/or a secondary display device, which may or may not have a display unit) including a control processor and a management server communicating with the IPTV client device over the Internet. The management server and IPTV client device communicate with at least one content server such that the content server provides audio video content to the IPTV client device for presentation of the content on the video display of the IPTV client device. The system further includes a proxy server communicating with the management server and the second device. Alternatively, the proxy server may return an executable utility to the second device. Yet another embodiment provides that the second device will communicate to the IPTV client device through an external server. The IPTV client sends login information to the management server which returns to the IPTV client an IPTV session token that is subsequently presented by the IPTV client device to a the content server to obtain content from the content server. The management server receives and stores a local IP address of the IPTV client device or an external IP address of the IPTV client device, which may include, for example Uniform Resource Indicator (URI) or Uniform Resource Locator (URL) or a network location or network address. The management server can also store an external IP address, which allows communication from a secondary device, which is outside the network, to the IPTV device. Responsive to the second device sending a request to the proxy server for an executable utility, the proxy server returns the utility to the second device. Further, the second device, executing the utility, prompts a user to input to the second device login information. The proxy server, responsive to reception of correct login information from the second device, returns the local IP address of the IPTV client to the second device. The second device uses the local IPTV address to access the IPTV client directly to request information about the IPTV client, which information is returned from the IPTV client to the second device such that the local address of the IPTV client need not be globally addressable. Also the second device sends the information about the IPTV client to the proxy server, requesting a list of services available to the IPTV client from one or more content servers. The proxy server relays the request for a list of services to the management server, which returns the list to the proxy server, with the proxy server in turn sending the list to the second device for presentation of information on the video display. Responsive to a user selection of an element on the list, the second device sends a request for a software asset corresponding to the element to the proxy server. The proxy server requests a service login of the content server providing the asset, and the content server provides to the proxy server a list of assets or categories or services which relays the list to the second device, which is presented on the video display of the second device so that the user can navigate to enter a selection. Responsive to the selection the second device sends a command to the IPTV client to play the selection.

The IPTV client requests, of the management server, information about the selection received from the second device. The information is returned from the management server to the IPTV client to enable the IPTV client to play content associated therewith. If desired, the proxy server can request of the content server a list of options, and the list is returned to the proxy server. Asset information may be requested by the IPTV client and returned thereto by the content server. Also, a request to log into service, received from the second device, may be sent by the IPTV client to the content server and a service session token returned to the IPTV client in response. When a list of contents is sent to the second device, URL of contents may be removed from the list. The second device requests a content using a unique identifier of the content, the proxy server or the management server may use the unique identifier of the content to locate a corresponding URL of the content. In this way, the second device may not obtain the URL of content so that unauthorized distributions of content are effectively prevented.

A consumer electronic device (CE) may act as a second device, which includes a housing holding a display, a network interface, and a processor controlling the display and communicating with the Internet through the network interface. An input device communicates with the processor. The processor executing logic includes sending login information to a proxy server, and receiving from the proxy server, responsive to reception thereby of correct login information, a local IP address of an IPTV client device. The processor uses the local IPTV address to access the IPTV client directly to request information about the IPTV client, sending the information about the IPTV client to the proxy server. Responsive to sending the information about the IPTV client to the proxy server, the processor receives content information, presenting it on the display from which a user can select a selected content. The processor commands the IPTV client to play the selected content.

A proxy server assembly includes at least one processor and at least one network interface communicating with the processor to establish communication between the processor and a wide area network.

At least one computer readable storage medium is accessible to the processor of the proxy server and has logic causing the processor to receive login information from a second device. Responsive to a determination that the login information is correct, the proxy server sends to the second device a local IP address of an IPTV client associated with the login information. The proxy server receives from the second device information about the IPTV client requesting a list of services available to the IPTV client from at least one content server and sends a request for the list of services to a management server. The proxy server receives from the management server the list and sends it to the second device for presentation of information on a video display thereof. The proxy server then receives from the second device a request for a software asset and responsive to the request for the software asset, requests to log into service of the content server. The proxy server receives back from the content server a list of assets or categories or services and sends the list to the second device. In this way, the list can be presented on a video display of the second device so that a user can navigate to enter a selection to command the IPTV client to play the selection.

A first device is connected with a plurality of electronic devices. A second device may transmit control commands to the first device using a communication network or internet to control the plurality of electronic devices.

Referring to FIG. 1, an IPTV system may include a first device such as a client consumer electronics device 12, a second device such as another consumer electronics device 38, an electronic device 29 connected with the first device, a management server 30, a proxy server 34, and a content server 32. Each of the above devices and servers may have both a wired communication interface and a wireless communication interface.

The client consumer electronics device (CE) 12, as a first display device, such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. The client consumer electronics device 12 has a unique identifier that, without other means, is able to identify the client consumer electronics device 12 within the IPTV system. The unique identifier may be assigned by a manufacturer or assigned by the management server when the client consumer electronics device 12 is registered in the IPTV system.

The processor 16 may access one or more computer readable storage media 22 such as but not limited to RAM-based storage (e.g., a chip implementing dynamic random access memory (DRAM) or flash memory or disk-based-storage. Software code implementing present logic executable by the CE device 12 may also be stored on one of the memories.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial. TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30.

If desired, each content server 32 may be associated with a respective proxy server 34 which interfaces the content server 32 with the device 12. The servers 30, 32, 34 have respective processors 30a, 32a, 34a accessing respective nontransitory computer readable storage media 30b, 32b, 34b which may be, without limitation, disk-based and/or solid state storage. The servers communicate with a wide area network such as the Internet via respective network interfaces 30c, 32c, and 34c. It is to be understood in view of disclosure below that the CE device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

The electronic device 29 is connected with the first device 12 using a cable such as a 1394 cable or a HDMI cable or using a wireless communication interface such as infrared signals. The electronic device 29 may be a digital video recorder, a Blu-ray player, a game player, an audio amplifier, an air conditioner or any controllable apparatus. Storage may be any suitable electronic storage, such as RAM, ROM, EEPROM, or other storage medium, or cloud-based storage using local or remote storage via a network, such as storage at a remote server.

A second device 36, as a control device or a second display device, may be another consumer electronics device. The second device 36 may be another TV, game player, video disk player, camera, digital clock radio, mobile telephone, personal digital assistant, laptop computer, etc. The second device 36 with a housing 38 has a digital processor 40 controlling a visual display 42 and an audible display 44 such as one or more speakers. The second or control processor 40 may access one or more computer readable storage media 46 such as but not limited to RAM-based storage (e.g., a chip implementing dynamic random access memory (DRAM) or flash memory or disk-based-storage. Software code implementing present logic executable by the second or control device 36 may also be stored on one of the memories shown. Further, the second or control processor 40 can receive user input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

Figure 2B:
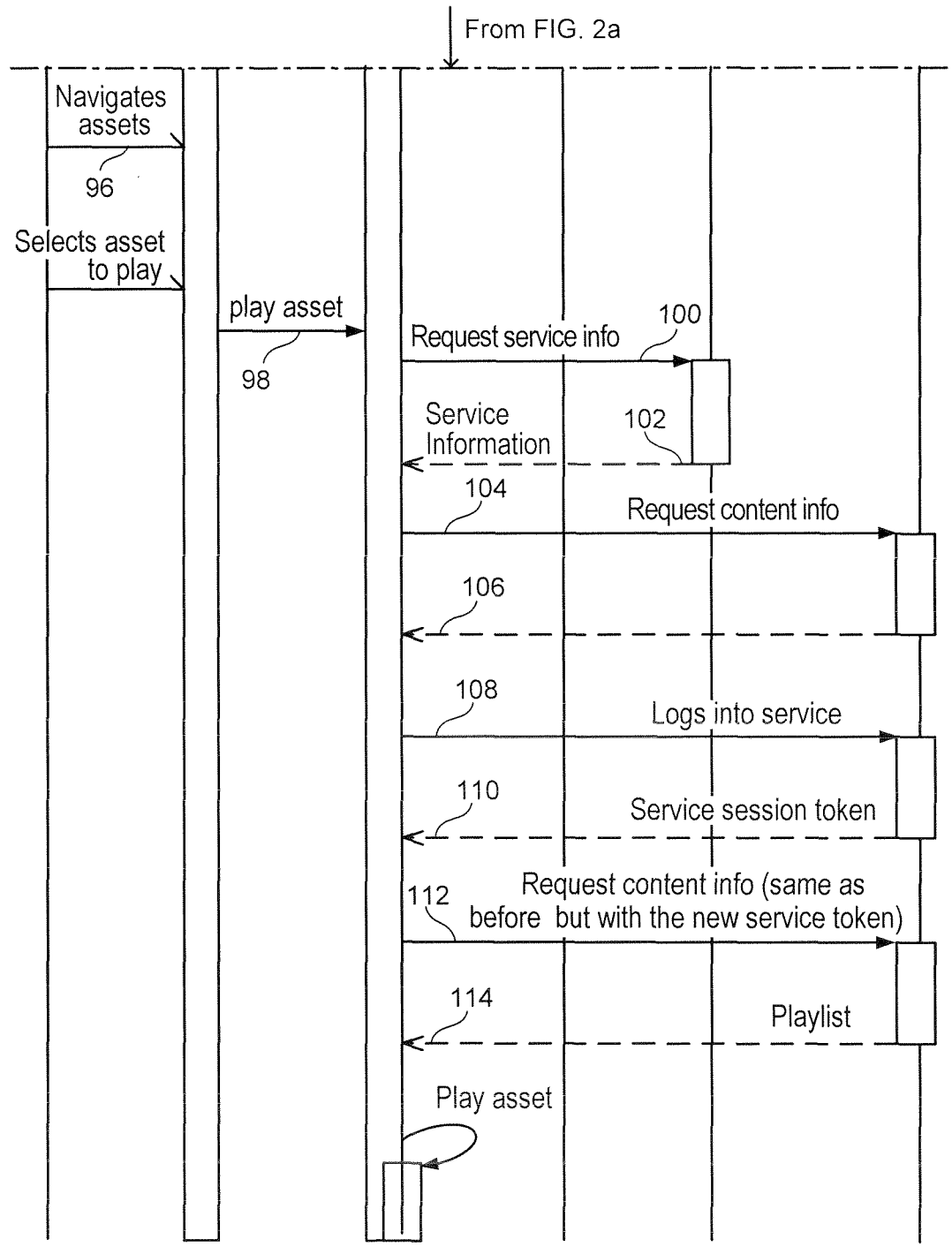

FIG. 2 shows an example for enabling a user to use a second device 36 to browse assets and select one asset to have a first device 12 such as a main IPTV client play the content (the IPTV client is also referred to as an IPTV client device and/or an IPTV device and/or IPTV herein). FIG. 2 assumes that the user has already created an account with the management server 30 and has affiliated the main IPTV device with that account. In general, a user loads the web application in the second device and logs into their user account, which may be the same account used for device registration. Once logged in, a list of compatible IPTV devices is presented. After the user selects one of the IPTV devices, a list of services that the device is entitled to is provided to the user. The user browses the services and their content, in his/her preferred language, on the second device as though it is an actual IPTV device such as the first device. Similar transactions, like video rentals or home shopping purchases, can also be made on the second device. Standard IPTV system interaction with service providers occurs on the proxy server, hence creating a firewall between the second device and content providers. Additional navigation features, like hyper-linked text which will open a new window and the management of premium services from a single location, provide better user experience in this IPTV system.

When a piece of content is selected, it may be sent to the IPTV for command execution (i.e., playback) in the form of a reference id which is used by the IPTV to retrieve content information. By eliminating the presence of the content URL on the second device, the risk of leaking major proprietary information which could result in huge losses is reduced. During the time of playback, the user can continue to browse for other content and queue it for future playback. The IPTV needs to be addressable by the second device to perform playback, which is the case when both devices are on the same local network. The user can also switch devices and resume playback on a different device such as the electronic device 19 in FIG. 1 by going to the recently viewed list and selecting the last video played after switching control to that device.

A detailed description of each state in FIG. 2 is provided as follows.

At state 52 a user turns on the first device 12, hereafter referred to as the "IPTV client" for convenience. At state 54 the IPTV client sends login information including, e.g., user name and password to the management server 30, which at state 56 returns to the IPTV client an IPTV session token that may subsequently be presented by the IPTV client device to a participating content server 32 to obtain content from that server. Also, the management server 30 stores the local location (IP address or IP address and port number) of the IPTV client 12.

At state 58, the user instantiates an IPTV client control utility on the second device 36. The utility executed on the second device 36, at state 60, sends a request to the proxy server 34, which returns (62) hypertext markup language (HTML) with JavaScript for the second device 36 to execute in accordance with description below. This JavaScript makes asynchronous JavaScript and extended markup language (XML) (AJAX) calls or other formats in other implementations, to the proxy server and to the IPTV client to obtain information to control the IPTV client. It is noted that state 60 is only needed in implementations that use a downloadable HTML application for the second display software. The behavior of the JavaScript applies to implementations that are built using JavaScript. In another embodiment, step 60 may not be necessary where other client application implementations are used, such as one where the client application is not downloaded each time it is used. It should also be noted that other technologies (e.g. C, C++, Perl, and Flash) can be used for the implementation of the client application and that neither HTML nor JavaScript are required.

With more specificity, at state 64 using the JavaScript received from the proxy server 34 the second device 36 prompts the user to input to the second device 36 the account login information, including, e.g., the same user name and password that the IPTV client device provided to the management server 30 at 54. Thus, the servers 30, 32, 34 communicate necessary account, information between them as needed to realize present principle.

At state 66 the proxy server 34, responsive to a correct user name and password from the second device 36, returns information about all IPTV clients 12 that are affiliated with the user account associated with the user name and password, including their local IP addresses which were stored by the management server 30 after login at 54 (and subsequently provided to the proxy server 34).

When the user inputs to the second device 36 at state 68 a selected IPTV client (in this example, the IPTV client 12) to use with the second device, the second device 36, using the local IP address returned at state 66, accesses the IPTV client 12 directly. The second device 36 requests device information about the IPTV client device 12 at state 70, including language information, rating information, digital rights management (DRM) information, etc. as desired, which information is returned from the IPTV client 12 to the second device 36 at state 72. Since the second device 36 knows the IP address of the IPTV client 12 and consequently communicates directly with the IPTV client 12, the second device 36 communicates using a local web address of the IPTV client 12 that need not be globally addressable, and may so communicate as long as the second device 36 and IPTV client 12 are on the same local network. It is noted that in state 70, the communication from the second device to the primary device may go through an external server in some implementations, which will allow the system to operate in environments where the primary device is not reachable by the second device due to the network configuration.

At state 74 the second device 36 sends the client information received at state 72 to the proxy server 34, requesting a list of services available to the IPTV client device 12 from one or more of the content servers 32. The proxy server 34 relays the request for a list of services at state 76 to the management server 30, which returns the requested service list at state 78 to the proxy server 34. The proxy server 34 in turn sends the services list to the second device 36 at state 80 for presentation of available services on, e.g., the second device display 42.

State 82 indicates that a user can input (using, e.g., the second device input device 48) a selection of a service on the list that was returned to the second device at state 80. In response, the second device 36, at state 84, sends a request for a list of content and categories to the proxy server 34 along with a service session token that the second device may have received from the content server 32 via the management server 30.

Responsive to the request, at state 86 the proxy server logs into the content server 32 providing the selected service. At state 88 the content server 32 provides to the proxy server 34 a service session token for the particular content server 34. State 90 indicates that, if desired, the proxy server 34 may also request a list of content and categories of the content server 32, and the list is returned at state 92 in, e.g., extended markup language (XML), JSON, or other language formatted to the proxy server 34, which relays the assets, categories, services, etc. available for selection to the second device 36 at state 94. When the list of assets or the list of options is provided to the second device, the URL associated with each asset or options are removed. A reference ID is added to the list for each asset and options. The second device requests a particular asset or option by using the reference ID. In this way, the second device may not obtain any URL of the assets or options.

The content available for selection is presented on the second device display 42 so that the user can navigate (96) the display to enter (98) a selection. Responsive to the selection the second device 36 at state 98 sends a command to the IPTV client 12 to play the selection. At state 100 the IPTV client 12 then requests service information of the management server 30 information about the service the selected asset is in, logging in to the service if required. The requested information is returned from the management server 30 to the IPTV client 12 at state 102, and when the IPTV client 12 receives the asset information it plays the asset at state 116. Note that if the IPTV client is already playing content, the new content commanded to be played by the second device is placed in a queue in the IPTV client and played when the current content completes. Alternatively, the IPTV client 12 can cause an interrupt in the currently playing content by terminating the current content and playing the requested content immediately.

Note further that the second device may command the IPTV client to play content by sending to the IPTV client over the home network commands coded as if they were sent from an infrared remote control (IR RC), specifically for example the commands may be in Sony® Infrared Remote Control System® (SIRCS) protocol. The second device may transmit command signals to the IPTV client to control the electronic device 29.

As shown in FIG. 2, if desired, temporally between states 102 and 106 a series of messages may be exchanged between the IPTV client 12 and the content server 32. For example, a request for content information may be made (104) by the IPTV client 12 and returned (106) by the content server 32. The above-described logging into the service may be relayed by the IPTV client 12 to the content server 32 at state 108 and a service session token returned to the IPTV client at state 110 along with the before-mentioned asset information. Also, a request for content information may be made (112) and a playlist returned to (114) the IPTV client device 12.

The software, such as JavaScript/HTML software, that is downloaded at state 62 can be make available to all electronic vendors who wish their users to be able to manipulate, such as, navigate, browse, and search IPTV content on a second device.

The following situations illustrate some scenarios where the second device complements the IPTV's shortcomings, hence providing better user experience for the IPTV user. For example, a group of friends is watching video clips on an IPTV. Each of them are browsing content on their own second display device and queuing up selections. In another example, someone is looking for content on a particular subject. They are able to quickly type in search terms using their second device even when those terms contain characters not supported by their IPTV. In another example, a first person is watching the end of a ball game on the IPTV while a second person uses a second display to select a movie for them to watch when the game ends. In another example, a user may be away from an IPTV, but the user may use a smart phone as the second device to browse contents and select a preferable content to be play on the IPTV.

In the above-identified situations, using a second device can provide many benefits, such as:
  Browsing in a person's own language without disturbing the big screen
  Ease of data entry in a language not supported by the IPTV
  On-device service affiliation for premium services like Netflix
  Cross-device playback and resume from a recently viewed list
  Social sharing of content to enhance content proliferation
  Management of subscription-based services from a single location
  Browsing and queue management on the move
  One-click Customer service without the need of entering personal or device information
  Quick access to relevant device specifications and manuals
  Hyper-linked text in forms directs users to informational sites
  Content Queue across devices
  Advertisement revenue through Second display usage The second device provides an enhanced user experience of the IPTV without adding to the hardware costs of the unit. It makes data entry easy and allows users to browse content on the side. It is also a global solution which connects various IPTVs together in a cohesive manner through its potential of initiating playback across devices. It also provides the highest level of customer service to users through its one-click customer service feature, where users do not even need to provide any device information which can be difficult to retrieve in the event of a device breakdown.

Figure 3:
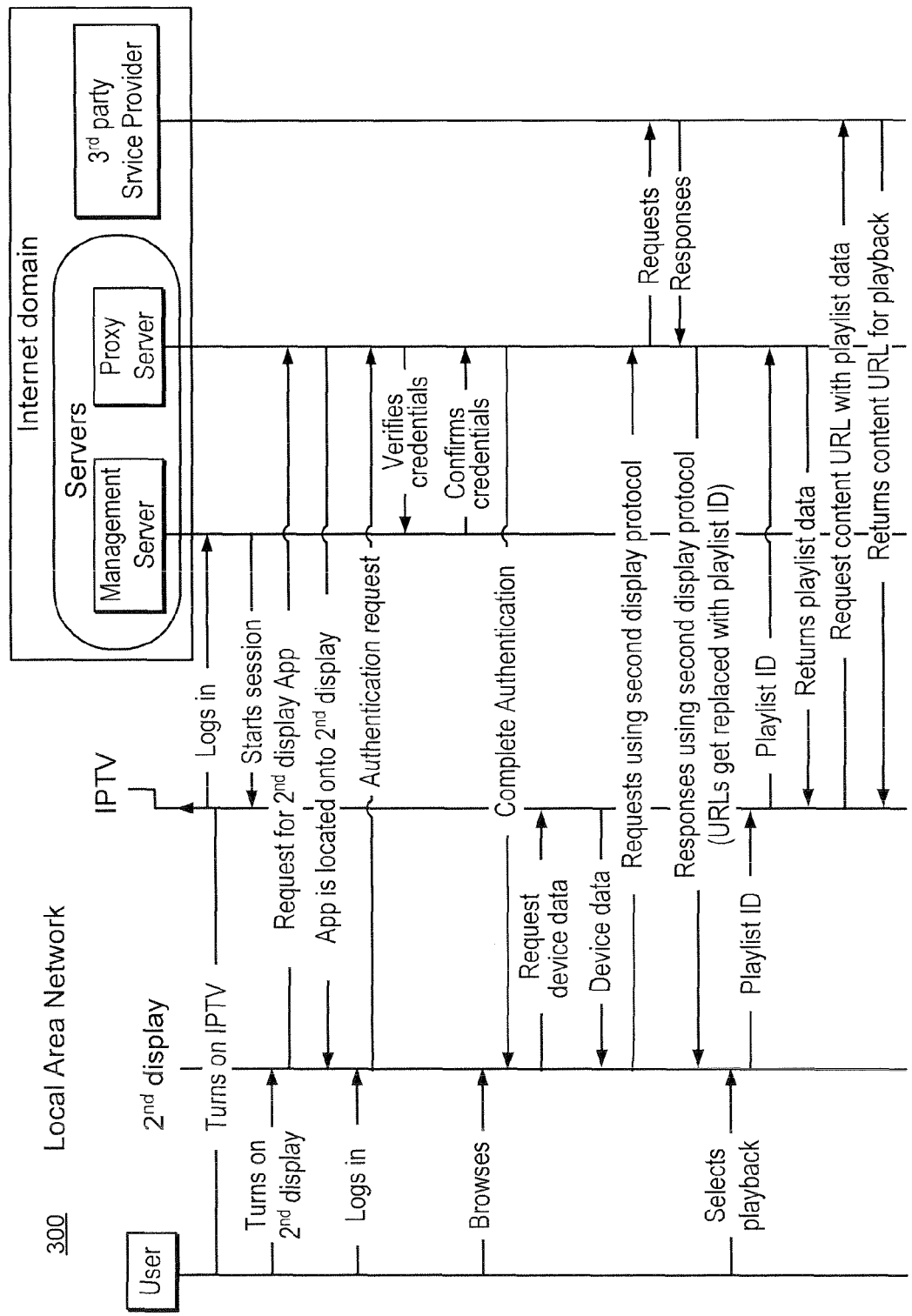
FIG. 3 shows a schematic representation of an application of the IPTV system.

FIG. 3 shows a schematic representation 300 in which the IPTV system finds ready application. First a user turns on an IPTV client. After the user logs in on the IPTV client into the manager server using the device credential, a session is started. Then the user turns on the second display device, and requests for a second display application to a proxy server (this can be a remote or local server). The application (native/interpreted application) is loaded onto the second display device. Then the user logs into the application using account information, the account is the same account used for the IPTV client to log in as described above (however, this is not the same account credential). An authentication request is sent from the second display device to the proxy server. The proxy server verifies credentials with the management server, and then the management server confirms credentials with the proxy server. Thus, authentication is completed.

Then the user browses an Internet video link (IVL). After that, the device data is requested from the second display device and then the requested device data is sent from IPTV client to the second display device. The second display device sends a request using second display protocol to the proxy server, and then the proxy server requests to service provider, and the service provider responds. The proxy server responds using a second display protocol to the second display device with the associated URL replaced with a playlist ID.

After the user selects playback, the playlist ID is sent from the second display to the IPTV client. Then the playlist ID is sent from the IPTV client to the proxy server, and playlist data is returned from the proxy server to the IPTV client. The IPTV client requests a content URL with playlist data of the service provider, and then the service provider returns the content URL for playback to the IPTV client. When the IPTV client device is not reachable, the playlist ID is not received and the second display device notifies the user that the IPTV client device is not reachable. The second display device stores the Playlist ID for a later attempt at sending to the IPTV client. In another embodiment, the second display device may inform a server of the playlist ID and when the IPTV device is connected to the server, may receive the request even when the IPTV device and the second display device are on separate local networks and cannot address each other. In this case, the IPTV device may still not be reachable, as in a case where the IPTV device may not be connected to a power supply, and the request is queued at the server to be sent at a later time when the IPTV device is reachable.

Figure 4:
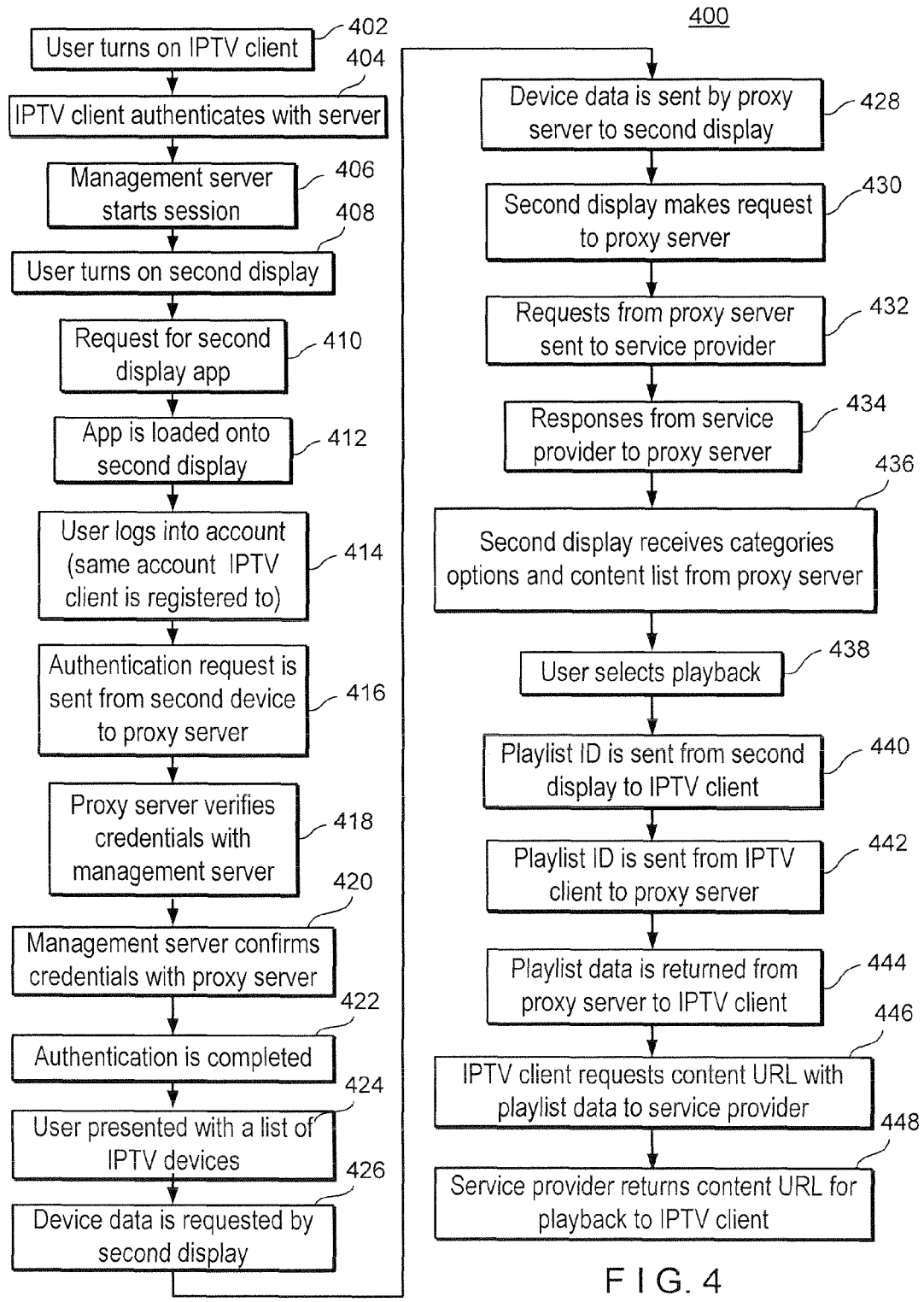
FIG. 4 shows a flow chart of processing steps-according to the IPTV system shown in FIG. 3.

FIG. 4 shows a flow chart 400 of processing steps according to FIG. 3.

The process begins in step 402 in which the user turns on IPTV client device. After the IPTV client device is registered, with the management server, or authenticated with the management server, as shown in step 404, the management server starts the session in step 406. Then in step 408 the user turns on the second display, and, when necessary, requests for second display application to a proxy server, as shown in step 410. The request for the second display application is optional. In some embodiments of the present invention, the second display will receive the second display application every time the application is started, while it is also an embodiment of the present invention that the second display device will not receive the second display application or only on a software update. When requested, the second display application is loaded onto second display, as shown in step 412. In step 414 the user logs into the account, which is the account the IPTV device is registered to. In step 416 an authentication request is sent from the second display to the proxy server, which may be a local server or remote server. In step 418 the proxy server verifies credentials with the management server, and then in step 420 the management server confirms credentials with the proxy server. In step 422 authentication is completed. It is an embodiment of the present invention that the server in steps 418 and 420 may be in the same server. Alternatively, there may be more than two servers splitting the server tasks.

In step 424 the user is presented with a list of IPV devices affiliated, or associated, with the secondary display device via the user account. In step 426, a user selects a particular IPTV device to communicate with. This communication may be an application program interface (API) call sent to the selected IPTV device. Device data for the IPTV client is requested by the second display device and in step 428 the requested device data is sent from IPTV client to the second display device. This information may include information specific to the IPTV device such as content rating permitted by that device, language, etc. In an embodiment in which the user has already selected an IPTV device in a previous session, an API call may be sent to that IPTV device to obtain device information without the user making a request. Also, according to an embodiment of the present invention, the user may set a particular IPTV device as the default device in a list of IPTV devices. In step 430 the second display makes requests using a second display API to the proxy server for options, categories and content list, and then in step 432 the proxy server in turn requests them from the service provider. The service provider responds, with options, categories and content list, as shown in step 434. In step 436 second display receives categories, options and content list from the proxy server and displays them for the user. Alternatively, the proxy server may send to the second display device the playlist ID associated with the URL to replace the URL. Alternatively, the service provider may permit, in some cases, that the URL is sent to the second display device. For example, the second display may have a secure application, and the service provider may allow a second display with a secure application to receive the URL. Thus, the content URL may be transmitted to the IPTV device for playback, rather than having the IPTV device retrieve the data from the server.

In step 438 the user selects content for playback and a playlist is created for that content and stored in the proxy server. Then in step 440 a playlist ID is sent from the second display device to the IPTV client device. If the IPTV client does not answer or does not acknowledge the request to play the content, or is unable to play the content at the time, such as when the IPTV client device may be on and reachable, but a viewer has enacted a "do not disturb" mode, the second display device informs the user that the IPTV client device is unreachable (not available to play the content at this time) and queues the request to be repeated at a later time when the IPTV client device is reachable. In step 442 the playlist ID is sent from IPTV client to proxy server, and returned from proxy server to IPTV client in step 444. In step 446 IPTV client requests content URL with playlist data to service provider, and then in step 448 the service provider returns content URL for playback to the IPTV client. Alternatively, the proxy server may store the URL content and thus, return the URL content to the IPTV client device without the need to request the content at the URL associated with the playlist data from the service provider. Thus, when the proxy server stores the URL, step 446 is not used, rather, once the IPTV client device obtains the URL, the IPTV client device can start.

An advantageous feature of the present invention allows a user of a second display device to specify a time segment for a recommended content for playback on the first display device such as the IPTV (Internet Protocol Television).

This feature of the present invention is used when a user of an Internet content provider service wants to share only a portion or a plurality of portions of a content with another user or subscriber of the Internet content provider service. The other parts of the content could be private or irrelevant. This means that the viewer of the shared content, namely another user, is directed to the most desirable part of the content instead of having to search/seek through the content to get to the shared portion of the content. Thus the viewer of the shared content is saved the trouble of searching/seeking through the content to find the shared portion. As a result, the viewer of the shared content has a better experience using the IPTV.

Currently, it is difficult, if not impossible for a first user to share content/asset with another user and to have that first user specify the start and end time of the content/asset to be shared. Sharing content is done on the content service provider end, but has not been done on the end-user side. To have a user be able to specify a start and end time for the shared content/asset will make content/asset sharing a more enriching experience.

As shown in FIG. 5, a user has a second display device, as a control device. The user loads the second display device with a display web application (S1). The user then logs into the Internet content provider service, as explained above, and receives a list of compatible IPTV devices, as first display devices. Once an IPTV device is selected, as explained above, the user receives, on the second display device, a list of services for the selected IPTV device. The user can then browse, on the second display device, the services and content/assets available for the selected IPTV device. Using the second display device, the user then selects a content/asset for sharing and selects a recipient (S2). The user then selects to share the entire asset or only a part of the asset. If only a part of a content or various parts of the content is/are to be shared, the user selects a start time and end time or a series of start and end times for playback of the respective content/asset (i.e. time segment for playback) (S3). There are various ways to select the start and end times as discussed below. If either the start and/or end time exceeds the start or end time of the contents, the web application automatically sets the inappropriately selected time to the appropriate boundary time, limit for the asset (S4, S5). The second display device then sends a request to share the content, which is sent with the start and end, times and recipient(s), to either the content provider service or proxy server. Note, although the content provider service may receive the request, the request may instead be directed to the proxy server so that all content provider service do not need to support this feature. Furthermore, since the proxy server acts as a "middleman" and directs the content from content provider service to the second display device web application or the IPTV client, the proxy server may provide this feature. The content provider server or proxy server receives the request from the web application via the second display device (S6). The content provider server or proxy server stores the ID of the selected recipient(s), the start and end time information and the information identifying the selected content/asset, the latter constituting a recommendation (S7). The content provider server or proxy server then sends a notification of the recommendation to a second display device of the selected recipient(s) (S8). Alternatively, the recommendation sent to the other user could alternatively be accessed and played directly through an IPTV device without using a second display device. This could be accomplished by having a list of recommendations available in a user specified service of the content provider service. These recommendation could them be browsed and played like any other list of content presented on the IPTV device.

When the another user/viewer/recipient receives the notification of the content/asset recommendation on his/her second display device, the recipient can then send the content/asset for playback on his/her own IPTV (the first display device). The IPTV then retrieves the start and end time information and content/asset identification information from the content provider server (S9). The start and end times act as an override over playing the entire content/asset. Some content providing services may require other assets, like link speed test or advertisements, to be played before the main content/asset. Thus, a resumed asset ID is added to the asset to ensure the correct asset/content is resumed. Note that the link speed test is a short video that is played before playing another video, usually a long duration video. Statistics are detected while playing a video and a report is sent to the content provider service about the video playback at the end of playback. For a link speed test, information gathered during the playback of that video is used in determining which of several different encodings of the main video is to be played based on the highest quality video that should not have problems with the network bandwidth that was detected while playing the link speed test video.

The start and end times may also be selected using the second display device during normal playback of content/asset. Before playing back the content/asset, the user can also specify the start and end time of a segment to playback. The start and end time information will be stored on the content provider server or the proxy server. This will allow the IPTV to receive override information (i.e. time segment information) when it requests the content/asset from the content provider server.

While the recommendation, received by a recipient of the content to be shared, includes a start and end time defining a segment of the content being recommended, the recipient can also navigate through the rest of that recommended content if the recipient otherwise has permission to watch the whole content. This could be accomplished through the normal navigation controls, such as fast forward, rewind, and skip backwards. There can also be special navigation options presented to the recipient especially for playing the whole content instead of just the recommended part of the content. These options can be given in the form of menu options or forms presented before and/or after playing the recommended portion of the content.

There are various ways to select the start and end times. These include, but are not limited to, indicating a start and end time by having the user mark a current location during playback, possibly while the content is paused. For example, it may be possible to jump forward and backwards by small steps or even single frames while the content is paused in order to help the user fine tune the current location of the content. Alternatively, the start and end times can be specified by the user through a numeric entry or by specifying a start time and a duration. Furthermore, the user could adjust the start and end times after they are set by moving pointers on a display, seeing the frame at the point being indicated by the pointer and viewing a location of that point on a timeline. There can be controls for moving the pointers forwards or backwards along a timeline. The user should be able to move the pointer by large steps until the pointer approaches the desired start or end time, and then be able to move the pointer by small steps to fine tune the location. This would allow the locations of the start/end points to be set entirely by adjustment by starting out with a start, point at a beginning of the content and ending at an end point at the end of the content.

An additional way to select the start and end times is by copying or modifying the start and end times from a recommendation of a previous user (first user) that was sent to the current user (second user) who then sends the recommendation to someone else (third user). Also, an additional way to select the start and end times is by selecting key frames or index points that are identified in the content. For example, a reference could be to "scene 3" in a video asset if the header of the video file or content metadata identified timings for individual scenes in the video. Furthermore, the start and end times could be selected from a menu or list.

It will be appreciated from the above that the invention may be implemented as computer software, which may be supplied on a storage medium such as through a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A system for playback on a display device comprising:
   a first display device, including circuitry, which displays content; and
   a second display device including circuitry and a web browser which interacts with a content provider server of the first display device, wherein a user, of said second display device, (a) selects only a portion of an internet video content, which is stored by an internet content providing service, for recommended playback only on the first display device, (b) selects a recipient, different from the user, associated with the content provider server of the first display device, and (c) sets start and end time points for the portion of the internet video content to play back as a recommended portion for viewing on the first display device by the recipient, wherein the second display device receives an identifier, to locate the internet video content, without an IP address of the internet video content stored by the internet content providing service so that the second display device sends the identifier for the recommended content to the first display device and the first display device sends the identifier without the IP address to a proxy server to obtain IP address data, the IP address data is then sent by the first display device to the internet content providing service to obtain the IP address in order to retrieve the internet video content from the internet content providing service, wherein unauthorized distribution by the second display device is prevented.

2. The system according to claim 1 wherein the second display device being a consumer electronic device including a cell phone, laptop or personal computer.

3. The system according to claim 1, wherein the selected content is to be shared with the selected recipient.

4. The system according to claim 1, wherein the second display device sends a request to share content, an identification of the selected recipient and the start end time points to the content provider server.

5. The system according to claim 1, wherein the second display device determines if the start and end time points set are within the time limits of the selected contents, and if not within the time limits, resets the start and/or end time points to be within the time limits.

6. The system according to claim 4, wherein the content provider server stores an ID of the selected recipient, the start and end time points and information identifying the selected content.

7. The system according to claim 1, wherein the content provider server sends a notification of selected content to a second display device of the selected recipient.

8. The system according to claim 7, wherein when the second display device of the selected recipient receives notification of the selected content, the recipient's second display device sends the content for playback on the recipient's first display device.

9. An internet protocol TV (IPTV) display device having circuitry comprising:
   a receiver receiving shared content recommendations for only a portion of an internet video stored by an internet content providing service from a display device of a user, which interacts with a content provider server of the IPTV display device of another user, via a web browser, wherein the display device receives an identifier, to locate the internet video, without an IP address of the internet video stored by the internet content providing service;
   a transmitter sending the identifier without the IP address to the content provider server to send thereto content recommended by the user of the display device; and
   a retrieving device retrieving the shared content recommendation for the portion of the internet video from the content provider server based on the identifier without the IP address including start and end times which are set by the user who recommended the content, wherein the user of the display device sends the identifier without the IP address for the shared content recommendations to the IPTV display device and the IPTV display device sends the identifier without the IP address to a proxy server to obtain IP address data, the IP address data is then sent by the first display device to the internet content providing service to obtain the IP address in order to retrieve the internet video from the internet content providing service so that unauthorized distribution by the display device is prevented.

10. The IPTV display device according to claim 9, wherein the display device is a consumer electronic device with the web browser including a cell phone, laptop computer or personal computer.

11. The IPTV display device according to claim 9, wherein the display device sends a request to share content, a recipient and the start end time points to the content provider server.

12. The IPTV display device according to claim 9, wherein the display device determines if the start and end time points set are within time limits of the shared contents, and if not within the time limits, resets the start and/or end time points to be within the time limits.

13. The IPTV display device according to claim 12, wherein the content provider server stores an ID of the recipient, the start and end time points and information identifying the shared content.

14. A display device having circuitry to select shared content for playback on a second device, the display device comprising:
 a web browsing device which browses the Internet and interacts with a content provider server of the second device;
 a selecting device selecting only a portion of an internet video content, which is stored by an internet content providing service, for sharing with a selected recipient associated with the content provider server of the second device and different from a user of the display device, wherein the display device receives an identifier, to locate the internet video content, without an IP address of the internet video content stored by the internet content providing service;
 a specifying device specifying a start time point and end time point of the shared portion of the internet video content; and
 a transmitter sending (a) the identifier without the IP address, (b) the specified start and end time points and (c) selected recipient identification to the content provider server of the second device, wherein the user of the display device sends the identifier without the IP address for the shared portion to the second device and the second device sends the identifier without the IP address to a proxy server to obtain IP address data, the IP address data is then sent by the first display device to the internet content providing service to obtain the IP address in order to retrieve the shared portion from the internet content providing service so that unauthorized distribution by the display devices is prevented.

15. The display device according to claim 14 wherein the first-mentioned display device is a consumer electronic device including a cell phone, laptop or personal computer.

16. The display device according to claim 14, wherein the first-mentioned display device determines if the start and end time points set are within time limits of the selected contents, and if not within the time limits, resets the start and/or end time points to be within the time limits.

17. A content provider server, having circuitry, for internet protocol TV (IPTV) devices, comprising:
 a receiver receiving a request for a display web application from a display device having a web browser;
 authenticating and sending device, having circuitry which authenticates the display device requesting the display web application, sends the display web application thereto after authentication thereof;
 receiving and storing device having circuitry which receives from the display device and stores (a) a recommendation, from a user of the display device, for an internet video contents, which is stored by an internet content providing service, to be shared with a recipient associated with the content provider server and (b) start and end time points of a portion of the shared internet video contents, the start and end time points being set by the user of the display device who is different from the recipient, wherein the display device receives an identifier, to locate the internet video content, without an IP address of the internet video contents stored by the internet content providing service; and
 retrieving and sending device retrieving the internet video contents to be shared and the start and end time points of the portion of the shared video contents based upon the identifier without the IP address sent from an internet protocol TV (IPTV) device of the recipient and sending the retrieved contents and start and end time points to the IPTV device, wherein the display device of the user sends the identifier without the IP address for the shared video contents to the IPTV device of the recipient and the IPTV device of the recipient sends the identifier without the IP address to a proxy server to obtain IP address data, the IP address data is then sent by the first display device to the internet content providing service to obtain the IP address in order to retrieve the shared video contents from the internet content providing service, wherein unauthorized distribution by the display device is prevented.

18. The content provider server according to claim 17, wherein the display device sends a request to share content, the recipient and the start end time points to the content provider server.

19. The content provider server according to claim 17, wherein the display device is a consumer electronic device with a web browser including a cell phone, laptop or personal computer.

20. The content provider server, according to claim 17 wherein the content provider server further comprising a notification device which sends a notification of selected content to a display device of the recipient.

21. A method of sharing content by an internet protocol TV (IPTV) display device having circuitry comprising the steps of:
 receiving shared content recommendations for only a portion of an internet video, stored by an internet content providing service, from a display device of a user which interacts with a content provider server of the IPTV display device of another user, via a web browser, wherein the display device of the user receives an identifier, to locate the internet video, without an IP address of the internet video stored by the internet content providing service;
 sending the identifier without the IP address to the content provider server to send thereto content recommended by the user of the display device; and
 retrieving the shared content recommendation for the portion of the internet video from the content provider server including start and end times set by the user who recommended the content, wherein the display device of the user sends the identifier without the IP address for the shared content recommendation to the IPTV display device and the IPTV display device sends the identifier without the IP address to a proxy server to obtain IP address data, the IP address data is then sent by the first display device to the internet content providing service to obtain the IP address in order to retrieve the content from the internet content providing service so that unauthorized distribution by the display device of the user is prevented.

22. A method to share content by a display device having circuitry to select shared content for playback on a second device, the method comprising the steps of:
- browsing the Internet and interacting with a content provider server of the second device;
- selecting only a portion of an internet video content, stored by an internet content providing service, for sharing with a selected recipient associated with the content provider server of the second device and different from a user of the display device, wherein the display device of the user receives an identifier, to locate the internet video content, without an IP address of the internet video content stored by the internet content providing service;
- specifying a start time point and end time point of the shared portion of the Internet video content; and
- sending (a) the identifier without the IP address, (b) the specified start and end time points set by the user and (c) selected recipient identification to the content provider server of the second device, wherein the display device sends the identifier without the IP address for the shared portion of the internet video content to the second device and the second device sends the identifier without the IP address to a proxy server to obtain IP address data, the IP address data is then sent by the first display device to the internet content providing service to obtain the IP address in order to retrieve the internet video content from the internet content providing service so that unauthorized distribution by the display device is prevented.

23. A method to share content by a content provider server, having circuitry, for internet protocol TV (IPTV) devices, comprising the steps of:
- receiving a request for a display web application from a display device having a web browser;
- authenticating the display device requesting the display web application and sending the display web application thereto after authentication;
- receiving and storing from the display device (a) a recommendation, from a user of the display device, for an internet video content stored by an internet content providing service to be shared with a recipient associated with the content provider server and (b) start and end time points of a portion of the shared internet video contents, the time points being set by the user of the display device who is different from the recipient, wherein the display device receives an identifier, to locate the internet video content, without an IP address of the internet video content stored by the internet content providing service; and
- retrieving the internet video contents to be shared and the start and end time points of the portion of the content based upon the identifier without the IP address received from an internet protocol TV (IPTV) device of the recipient and sending the retrieved contents and start and end points set by the user to the IPTV device, wherein the display device sends the identifier without the IP address for shared internet video contents to the IPTV device and the IPTV sends the identifier without the IP address to a proxy server to obtain IP address data, the IP address data is then sent by the first display device to the internet content providing service to obtain the IP address in order to retrieve the internet video contents from the internet content providing service so that unauthorized distribution by the display device is prevented.

* * * * *